United States Patent

[11] 3,576,158

| [72] | Inventors | Joseph Greenspan<br>Evergreen Park, Ill.;<br>Clay E. Hawkins, Springfield, Mo. |
|---|---|---|
| [21] | Appl. No. | 653,841 |
| [22] | Filed | July 17, 1967 |
| [45] | Patented | Apr. 27, 1971 |
| [73] | Assignee | Frigidmeats, Inc.<br>Chicago, Ill. |

[54] MEAT-TENDERIZING APPARATUS
3 Claims, 5 Drawing Figs.

[52] U.S. Cl. .................................................... 99/254,
99/107, 118/21
[51] Int. Cl. .................................................. A23l 3/34
[50] Field of Search........................................ 99/107,
159, 254—257; 118/15, 21, 25, 24; 12/28, 26

[56] References Cited
UNITED STATES PATENTS

| 2,756,666 | 7/1956 | Zaenkert .................. | 99/257 |
| 2,961,991 | 11/1960 | Girardi ..................... | 118/24 |
| 3,081,691 | 3/1963 | Schmidt .................... | (99/254UX) |
| 3,149,554 | 9/1964 | Greenspan ................. | 99/254 |
| 3,256,801 | 6/1966 | Greenspan ................. | 99/254 |
| 3,272,154 | 9/1966 | Kratz........................ | 118/24X |
| 3,282,195 | 11/1966 | Young et al. ............... | 99/254 |
| 3,347,679 | 10/1967 | Nordin...................... | 99/254X |

Primary Examiner—Billy J. Wilhite
Attorney—Hume, Clement, Hume & Lee

ABSTRACT: Moving meat incrementally on a conveyor belt, aperturing the meat in coordination with the belt movement with a group of pins having a coverage corresponding to the incremental advance of the belt, spraying a controlled rate of flow of liquid meat-tenderizing solution on the meat after it has been apertured, and blowing unabsorbed liquid from the upper surface of the meat with a high velocity airstream to evenly distribute and remove all excess unabsorbed liquid.

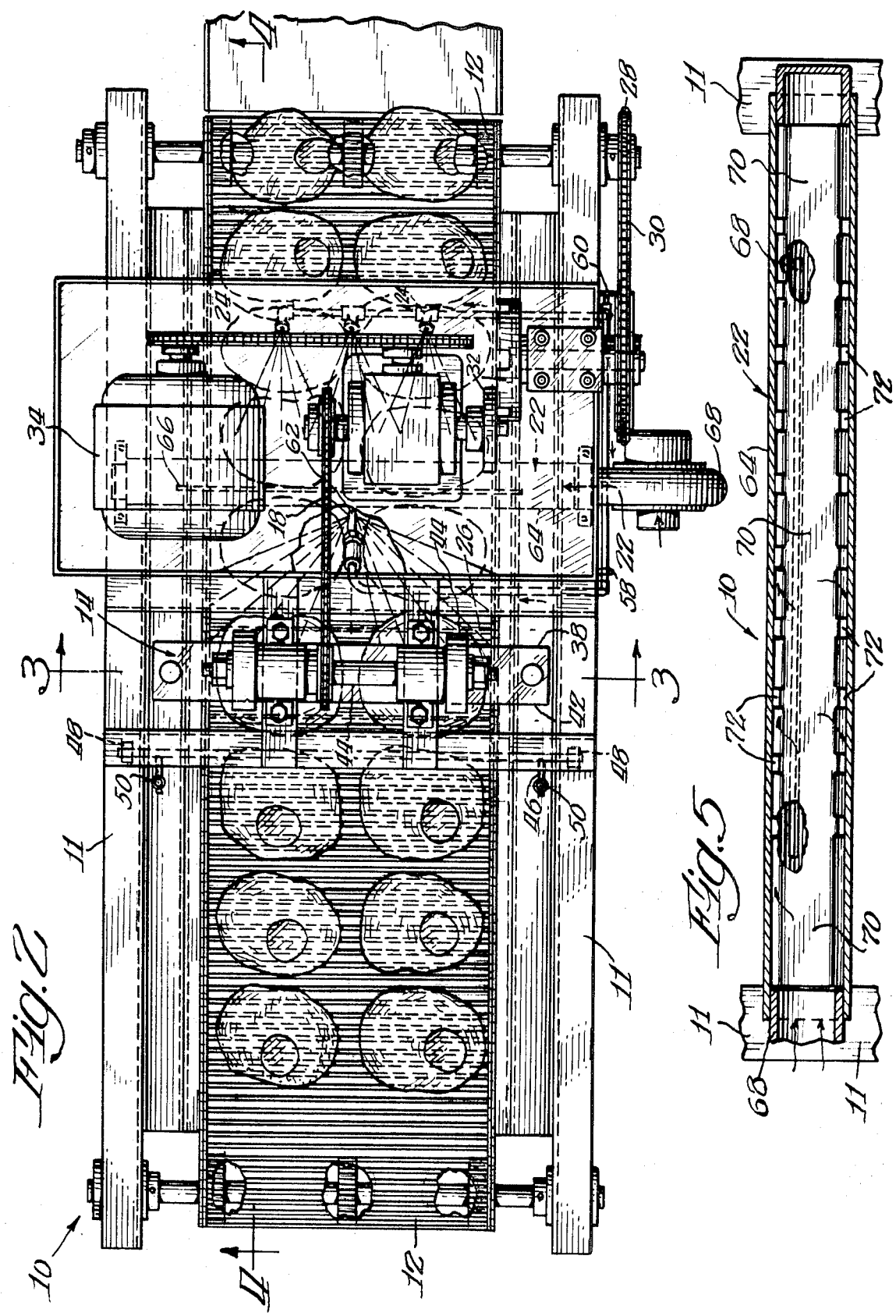

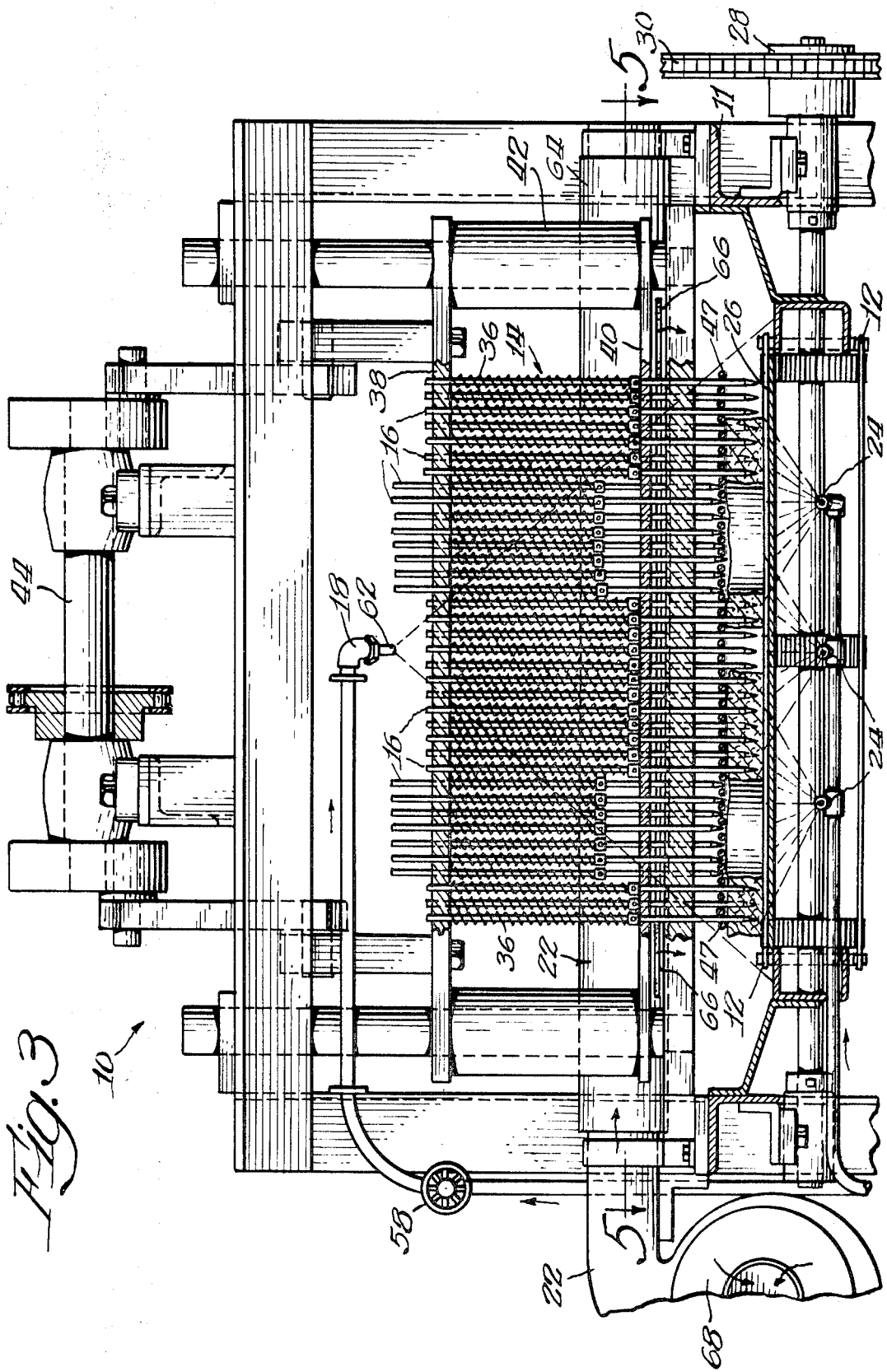

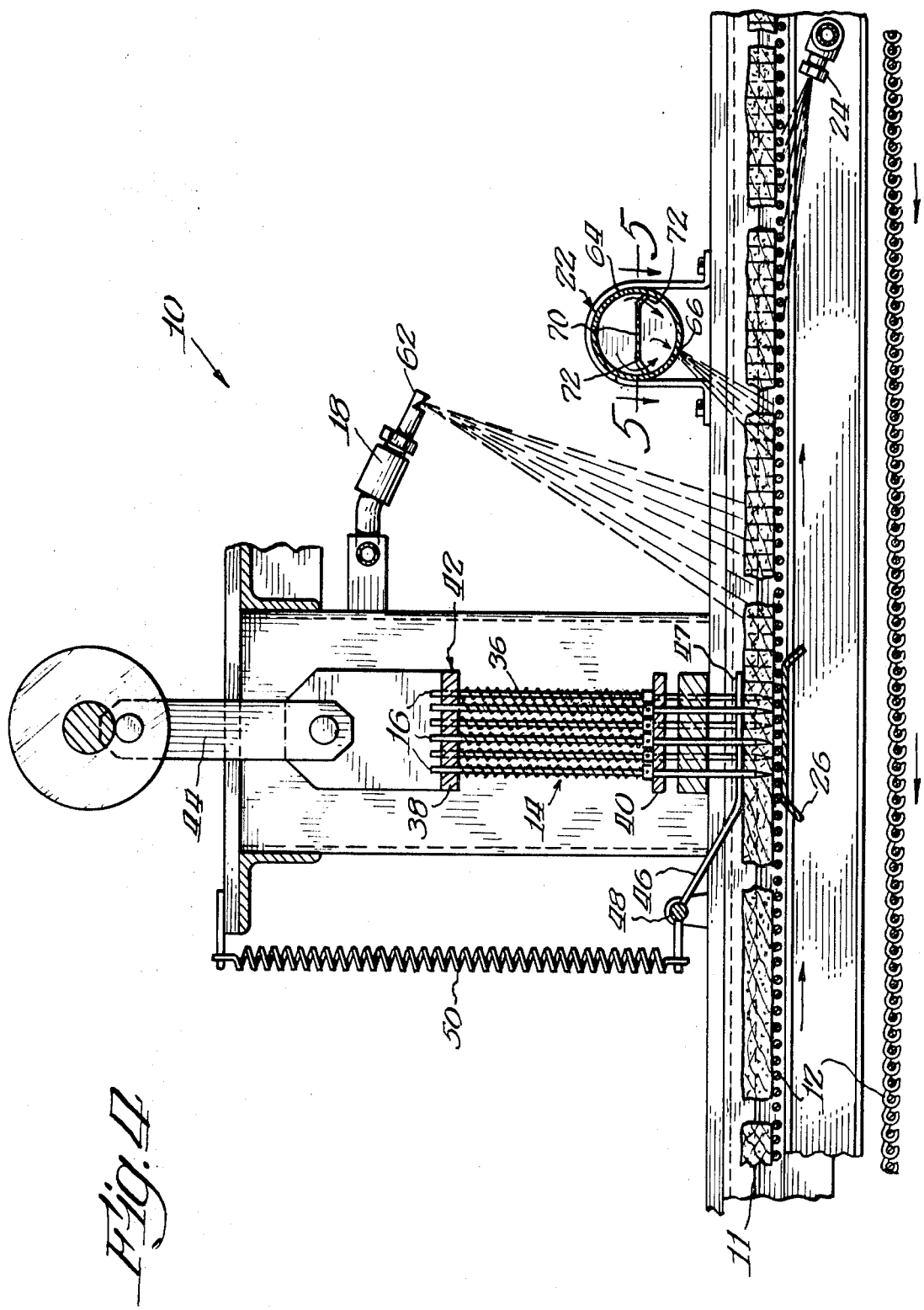

MEAT-TENDERIZING APPARATUS

The present invention relates to an apparatus for commercially tenderizing meat, which provides higher production rates yet insures a complete and even tenderizing treatment of all meat processed regardless of the size, shape or surface configuration of the meat. Complete treatment of the meat with liquid meat-tenderizing solution and a positive removal of excess tenderizing liquid from the meat is provided without contact or physical handling of the meat. Apparatus constructed in accordance with the invention is simple, reliable and sanitary.

The meat is preferably apertured with a group of spaced pins which penetrate through the upper surface of the meat into its interior. The meat apertures have sufficiently small dimensions to be self-closing after the meat is treated. Liquid meat-tenderizing solution is applied to the upper surface of the meat before the apertures have closed, preferably by spraying apparatus. Localized overabsorption of liquid meat-tenderizing solution is prevented by blowing substantially all of the unabsorbed solution off of the upper surface of the meat with a high velocity airstream promptly after its application. Liquid tenderizing solution may also be sprayed onto the lower surface of the meat. The meat is preferably advanced into the group of pins on an incrementally moving conveyor synchronized with the movement of the pins so that all of the meat placed in any position on the conveyor is automatically apertured.

Further objects, features and advantages of the invention pertain to the particular method, arrangement and structure whereby the above mentioned advantages of the invention are attained. The invention will be better understood by reference to the following description and to the drawings forming a part thereof wherein:

FIG. 2 is a top plan view of the embodiment of FIG. 1;

FIG. 3 is a front cross-sectional view taken along the plane 3–3 of FIG. 2;

FIG. 4 is a cross-sectional view taken along the plane 4–4 of FIG. 2; and

FIG. 5 is a partial cross-sectional view taken along the plane 5–5 of FIG. 4.

DESCRIPTION OF THE EXEMPLARY EMBODIMENT

Figure 1:
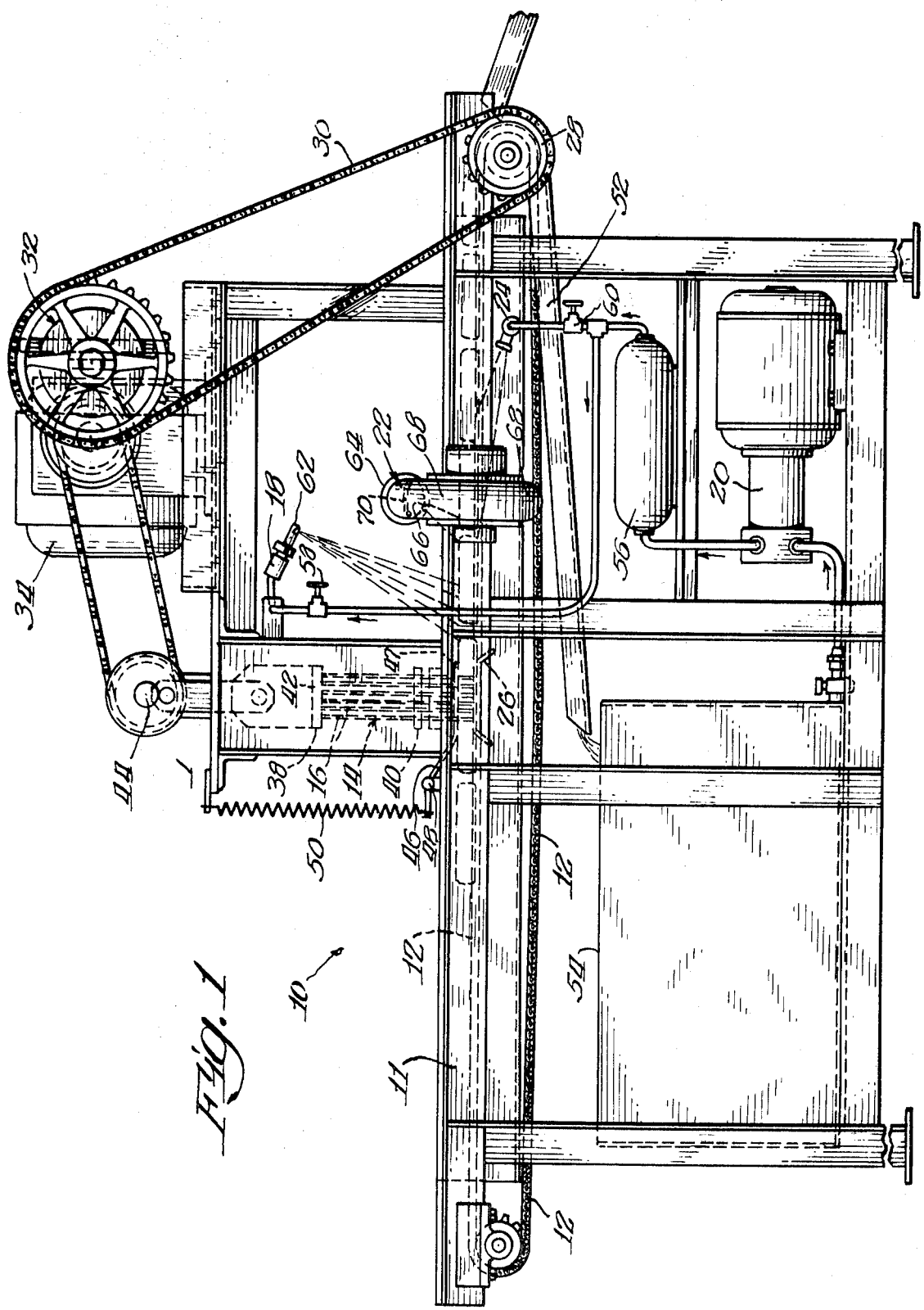
FIG. 1 is a side view of an exemplary meat-tenderizing machine in accordance with the present invention.

Referring to FIGS. 1 through 5, there is shown therein a meat-tenderizing machine 10 in accordance with the present invention. The meat-tenderizing machine 10 includes an endless conveyor 12 on a framework 11 incrementally carrying meat under a reciprocally driven group 14 of meat-aperturing pins 16. The apertured meat on the conveyor 12 is carried under the spray pattern from an overhead sprayer 18. The sprayer 18 is supplied with a controlled rate of flow of liquid meat-tenderizing solution from a pump 20. The meat is then carried under a blower assembly 22 which evenly distributes and removes unabsorbed liquid meat-tenderizing solution on the upper surface of the meat. The meat is then advanced past a lower sprayer 24 and discharged from the end of the machine 10.

Considering in detail the conveyor 12 and its drive, it may be seen that the conveyor 12 is of flexible open bar construction. Substantial spacing is provided between the transverse bars so that the under surface of meat, which is on the flat upper flight of the conveyor, is substantially entirely exposed. The meat is not carried by the conveyor through any tanks or troughs of liquid meat-tenderizing solution. The conveyor 12 is slidably supported only at its outer edges on the framework 11 except directly underneath the pin group where an underlying horizontal support plate 26 is provided. The conveyor 12 is chain-driven by a driving sprocket 28 at the rear end of the machine. The driving sprocket 28 is driven through a chain 30 from a Geneva drive 32. The Geneva drive 32 may be of suitable conventional construction and is driven by a drive motor 34. The same drive motor 34 also here powers the reciprocal drive of the group of pins 14. However, it will be appreciated that separate drive motors may be provided. Although the drive motor 34 and Geneva drive 32 are here shown for drawing clarity as positioned above the conveyor 12, it will be appreciated that for sanitary reasons it is preferable that both units be mounted underneath the conveyor 12.

Considering the pin group 14, it may be seen that the entire group is reciprocally operated as a unit toward and away from the conveyor surface of the conveyor 12 for aperturing the meat with a plurality of spaced apertures, which apertures extend from the upper surface of the meat substantially, but not entirely, therethrough. As may be seen particularly from FIG. 3, the individual pins 16 are preferably small diameter cylindrical steel rods, each independently driven through individual coil compression springs 36. This allows those individual pins which encounter bones or other obstruction to be restrained while the remainder of the pins 16 move down through any pieces of meat thereunder.

All of the pins 16 are individually slidably retained between an upper plate 38 and a lower plate 40 of a pin frame 42. The pin frame 42 is vertically reciprocally driven toward and away from the conveyor 12 by a crank drive 44 driven by the drive motor 34. It may be seen that the lowermost driven position of the lower ends of the pins 16 is closely spaced above the surface of the conveyor 12.

The lower ends of the pins 16 are preferably tapered to a rounded point, and the diameter of the pins is preferably not larger than one-fourth inch. Such pins are suitable for aperturing the meat with apertures having sufficiently small dimensions to be self-closing after the meat has been treated. Thus, there is no visible change in the appearance of the meat and its saleability is not affected.

In the machine 10, automatic even coverage and treatment of all meat placed on the conveyor 12 is provided regardless of the position or size of the pieces of meat. To this end, the pin group 14 preferably has its pins 16 evenly closely spaced apart over a rectangular area extending the full width of the conveyor 12. Further, the pin group 14 preferably extends evenly along the length of the conveyor, i.e. in the direction of movement of the conveyor, by a distance equal to, or somewhat greater than, the incremental distance by which the conveyor 12 is advanced for each reciprocal cycle of the pin group 14. For example, for a pin group 14 length of 2¼ inches, the drive of the conveyor 12 is preferably geared to provide an incremental advance of the conveyor 12 of 2 inches. Thus, all meat surfaces placed on the conveyor 12 are evenly apertured and the feeding of meat into the machine 10 is not critical. Automatic synchronization between each downward or aperturing stroke of the pin group 14 and the subsequent incremental advance of the conveyor 12 after the pin group 14 is raised out of the path of the meat is provided through the common drive of the pin group 14 and the conveyor 12 from the single drive motor 34. Accordingly, the machine 10 may be operated at a varied and high rate of production.

A stripper 46 is preferably provided in association with the pin group 14 to hold the meat down on the conveyor 12 when the pin group 14 is raised. This insures that all of the meat is stripped from the pin 16 and also that the pins are not bent or damaged by moving upwardly with bone material caught between adjacent pins. The stripper 46 may be particularly clearly seen in FIGS. 3 and 4 taken together, It is preferably a comblike member having a multiplicity of teeth 47 which project horizontally and rearwardly through the pin group 14 between each of the pins 16. The forward edge of the stripper 46 angles upwardly and is horizontally pivotable about a pivotable connection 48 to the framework 11. Thus, the stripper 46 is readily deflected upwardly by meat moved under the pin group 14 by the conveyor 12. An extension of the stripper 46 forward of the pivotable connection 48 is subjected to an upward force by a coil spring 50. Accordingly, the teeth 47 of the stripper are all downwardly spring biased toward the conveyor 12 causing the teeth 47 to bear downwardly against the upper surface of the meat and to restrain the meat from any upward movement.

Referring to FIG. 1, it may be seen that there is a circulating system provided for the liquid meat-tenderizing solution in the machine 10. Any suitable conventional liquid meat-tenderizing solution may be employed. A drip pan 52 underlies both flights of the conveyor 12 rearwardly of the pin group 14. All liquid sprayed through the conveyor 12 or otherwise not absorbed by the meat is captured by the drip pan 52 and returned to a liquid storage tank 54. The liquid is supplied from the tank 54 to the sprayers by the pump 20 which pumps the liquid under pressure through a filter 56 and into fluid lines connected respectively with the overhead sprayer 18 and the lower sprayer 24. Respective valves 50 and 60 are in the lines to each sprayer to control the rate of flow of meat-tenderizing liquid which issues from each of the sprayers.

Considering the overhead sprayer 18, it will be appreciated that it may comprise one or more spray nozzles, although it comprises here a single nozzle 62. It has been found that controlled spraying, as opposed to immersing or flooding the meat with the meat-tenderizing solution, provides a more even and accurate control over the liquid distribution and over the liquid absorption of the meat. The amount of meat-tenderizing liquid which may be absorbed in the meat is quite critical and must be carefully controlled.

A suitably accurate uniform coverage spray nozzle 62 for the overhead sprayer 18 may be a commercially available such as, for example, the model "¼ K SS 2.5" nozzle manufactured by Spraying Systems Co. This nozzle produces a diverging spray pattern covering evenly the full width of the conveyor. It may be seen that the spray pattern is directed downwardly toward the conveyor immediately adjacent the rearward edge of the pin group 14. Thus, the meat-tenderizing solution is sprayed onto the upper surfaces of the meat on the conveyor immediately after the meat has been apertured and before the apertures in the meat have closed, thereby enabling the meat-tenderizing liquid to enter the apertures to provide tenderizing solution throughout the interior of the meat.

Considering the lower sprayer 24, it may be seen that this unit here comprises three separate spray nozzles which are spaced below the conveyor 12 and spray upwardly therethrough so as to spray the bottom surface of the meat. It may be seen that these sprays are arranged to spray forwardly to the machine at a substantial angle as well as upwardly so as to confine the spray and provide complete coverage of the conveyor 12. The nozzles of the lower sprayer 24 may also be commercially available units such as the Teejet SS 110015 manufactured by Spraying Systems Co.

The blower assembly 22 is adapted to evenly distribute and blow substantially all of the unabsorbed liquid meat-tenderizing solution off of the upper surface of the meat sufficiently promptly after the application of the liquid meat-tenderizing solution to prevent localized overabsorption. The uneven upper surface of the meat tends to concentrate any unabsorbed liquid thereon in pools which, if not promptly removed, will cause the areas of the meat underlying the pools to become heavily overtenderized. This is a serious problem in the use of liquid meat-tenderizing solution. Further, it is desirable that the liquid be evenly spread or distributed over the upper surface of the meat and into the apertures in the meat. The blower assembly 22 accomplishes these objectives by discharging a moving airstream against the upper surface of all of the meat on the conveyor promptly after the solution has been applied. This airstream has a velocity sufficient to evenly distribute and push substantially all unabsorbed liquid across and off of the upper surface of the meat. The blower assembly provides a completely sanitary method of removal of the excess liquid without any mechanical contact with or handling of the meat.

The blower assembly 22 here includes a large diameter cylindrical air conduit 64 extending transversely across and spaced several inches above the conveyor 12, and adjacent the rearward edge of the spray pattern of the overhead sprayer 18.

The air conduit 64 has a narrow air discharge slot 66 in its lower surface extending evenly across the conveyor 12. The air conduit 64 is otherwise closed and supplied with air by a centrifugal blower 68. A suitable commercially available blower 68 is unit 71/2P, catalog No. 4266, manufactured by ILG Electric Ventilating Co., having a ¼-horsepower motor. The output of the centrifugal blower 68 is connected directly into one end of the air conduit 64.

The slot 66 is preferably much narrower than the dimensions of the air conduit 64 so as to provide a thin but uniform high velocity airstream. A ⅛-inch wide slot has been found to be suitable. The slot 66 may be located at a slight angle forward from the vertical so as to blow the excess liquid in one direction, i.e. forward across the meat surface. As may be particularly seen in FIGS. 4 and 5, a baffle plate 70 may be provided inside the air conduit 64 to help maintain an even pressure and even velocity output along the entire length of the slot 66. It may be seen that the baffle plate 70 is a horizontal member extending the length of the air conduit 64 and having a width slightly less than the diameter of the air conduit. It extends between opposite sides of the air conduit to prevent the passage of air between the upper and lower halves of the conduit except through restricted passageways 72 which are spaced along the edges of the baffle plate 70.

Considering the basic operation of the meat-tenderizing machine 10, it may be seen that the process performed thereby is fully automatic. The pieces of meat may be randomly placed upon the forward end of the conveyor 12 in any suitable manner and regardless of the thickness, size or bone configuration of the pieces of meat. The pieces of meat are automatically incrementally advanced by the conveyor 12 under the pin group 14 where they are held down by the stripper 46 and evenly apertured by the pins 16 which operate together as a pin group 14 in synchronization with the movement of the conveyor 12. Complete aperturing of the meat is provided. As the meat is advanced from underneath the pin group 14 by the conveyor 12, it is sprayed with a controlled rate of flow of meat-tenderizing solution by the overhead sprayer 18 prior to the closing of the apertures in the meat. The sprayed meat is then directly thereafter passed underneath the blower assembly 22 where the high velocity air stream evenly distributes the unabsorbed liquid over the surface of the meat and removes the excess. The lower surfaces of the meat are then sprayed with a controlled quantity of meat-tenderizing solution by the lower sprayer 24. The open mesh of the conveyor 12 allows all excess meat-tenderizing solution from the sides and lower surfaces of the meat to drip through the conveyor and into the drip pan 52 where it is recaptured and recirculated. The completely treated pieces of meat are then automatically discharged from the rearward end of the conveyor 12. The meat discharged from the machine 10 has thus received a complete meat-tenderizing treatment and no further tenderizing processing is required.

The apparatus described herein is presently considered to be preferred; however, it is contemplated that further variations and modifications within the purview of those skilled in the art can be made herein. The following claims are intended to cover all such variations and modifications as fall within the true spirit and scope of the invention.

We claim:
1. Apparatus for tenderizing meat comprising:
framework means,
conveyor means on said framework means for moving meat through said apparatus on said conveyor means,
aperturing means on said framework means for opening a plurality of spaced self-closing apertures through the upper surface of meat on said conveyor means including a group of evenly spaced aperturing pins reciprocally movable toward said conveyor means,
intermittent drive means for incrementally advancing said conveyor means by a preset incremental distance,
said group of meat-aperturing pins having an even width in the direction of movement of said conveyor means substantially equal to said preset incremental distance, said group of meat-aperturing pins extending transversely across said conveyor means, means for reciprocally operating said group of meat-aperturing pins after each said incremental advance of said incremental means so that all of any meat placed in any position on said conveyor means is automatically apertured, liquid-dispensing means on said framework means for applying liquid meat-tenderizing solution to the upper surface of the meat on said conveyor means after the meat has been apertured by said aperturing means, and liquid-distributing means on said framework means for evenly distributing and removing unabsorbed liquid meat-tenderizing solution from the upper surface of the meat on said conveyor means.

2. The apparatus of claim 1 including a multiplicity of spaced stripping fingers extending through said aperturing pins, and means for biasing said stripping fingers toward said conveyor means to retain said meat against said conveyor means as said pins are removed from said meat.

3. The apparatus of claim 1 wherein said liquid distribution means includes means for discharging a moving stream of fluid against the upper surface of said meat on said conveyor means with a velocity sufficient to remove unabsorbed liquid therefrom.